United States Patent [19]

Kawamura

[11] Patent Number: 4,466,416
[45] Date of Patent: Aug. 21, 1984

[54] EXHAUST GAS RECIRCULATION CONTROL METHOD AND APPARATUS FOR A DIESEL ENGINE

[75] Inventor: Yoshihisa Kawamura, Yokosuka, Japan

[73] Assignee: Nissan Motor Company, Limited, Kanagawa, Japan

[21] Appl. No.: 404,912

[22] Filed: Aug. 3, 1982

[30] Foreign Application Priority Data

Aug. 4, 1981 [JP] Japan .................. 56-122028

[51] Int. Cl.³ ............................................. F02M 25/06
[52] U.S. Cl. .................................... 123/571; 123/569
[58] Field of Search ............................... 123/571, 569

[56] References Cited

U.S. PATENT DOCUMENTS

| | | | |
|---|---|---|---|
| 4,181,944 | 1/1980 | Yamauchi et al. | 123/569 |
| 4,237,837 | 12/1980 | Toda et al. | 123/569 |
| 4,304,210 | 12/1981 | Hayakawa | 123/571 |
| 4,369,753 | 1/1983 | Sugiyama | 123/569 |
| 4,387,694 | 6/1983 | Yoshiba et al. | 123/569 |

OTHER PUBLICATIONS

1981 Datsun 810 Diesel Service Manual, (Publication No. SM1E-910SU0, Printing Mar. 1981): Chapter, Emission Control System.

*Primary Examiner*—Wendell E. Burns
*Attorney, Agent, or Firm*—Lowe, King, Price & Becker

[57] ABSTRACT

An exhaust gas recirculation method and apparatus controls the duty cycles of a throttle valve provided in an air intake passageway leading to a diesel engine, and an exhaust gas recirculation valve provided in an exhaust gas recirculation passageway connecting the air intake passageway and an exhaust gas passage, according to a predetermined relationship. The respective valves are controlled via corresponding diaphragm actuators and electromagnetic valves for actuating the actuators by a control unit which produces duty cycle control signals for the respective electromagnetic valves in accordance with sensed operating parameter signals which represent engine speed, load and coolant temperature. The control of the throttle and EGR valves are related so that the throttle valve is held fully open when the EGR valve is not fully open. This ensures the absolute minimum emission of exhaust HC throughout the range of throttle-EGR control.

8 Claims, 6 Drawing Figures

EXHAUST GAS RECIRCULATION CONTROL METHOD AND APPARATUS FOR A DIESEL ENGINE

BACKGROUND OF THE INVENTION

The present invention relates to an internal combustion engine, and more particularly to an exhaust gas recirculation (EGR) control for a diesel engine.

SUMMARY OF THE INVENTION

The present invention provides both method and apparatus to achieve exhaust gas recirculation control by independently controlling the operation of a throttle valve provided in an air intake passageway leading to a diesel engine, and an exhaust gas recirculation valve provided in an exhaust gas recirculation passageway connecting the air intake passageway to an exhaust gas passage. The valves are controlled by a control unit via corresponding diaphragm actuators and electromagnetic valves for actuating the actuators. The control unit produces duty-cycle control signals for the respective electromagnetic valves in accordance with sensed operating parameter signals which represent engine speed, load and coolant temperature. The control of the throttle and EGR valves are related so that the throttle valve is held completely open when the EGR valve is partially open.

According to the present invention, the opening of the EGR control valve and the intake throttle valve are precisely controlled corresponding to changes in operating conditions so that the production of the amount of HC (hydrocarbons) and particulate emissions can be greatly suppressed and a small EGR rate can be used to decrease emissions of oxides of nitrogen to a required low level. This results in optimal EGR control in which exhaust, driving response and fuel economy are in harmony under all engine operating conditions.

DETAILED DESCRIPTION OF THE PREFERRED EMBODIMENTS

Figure 1:
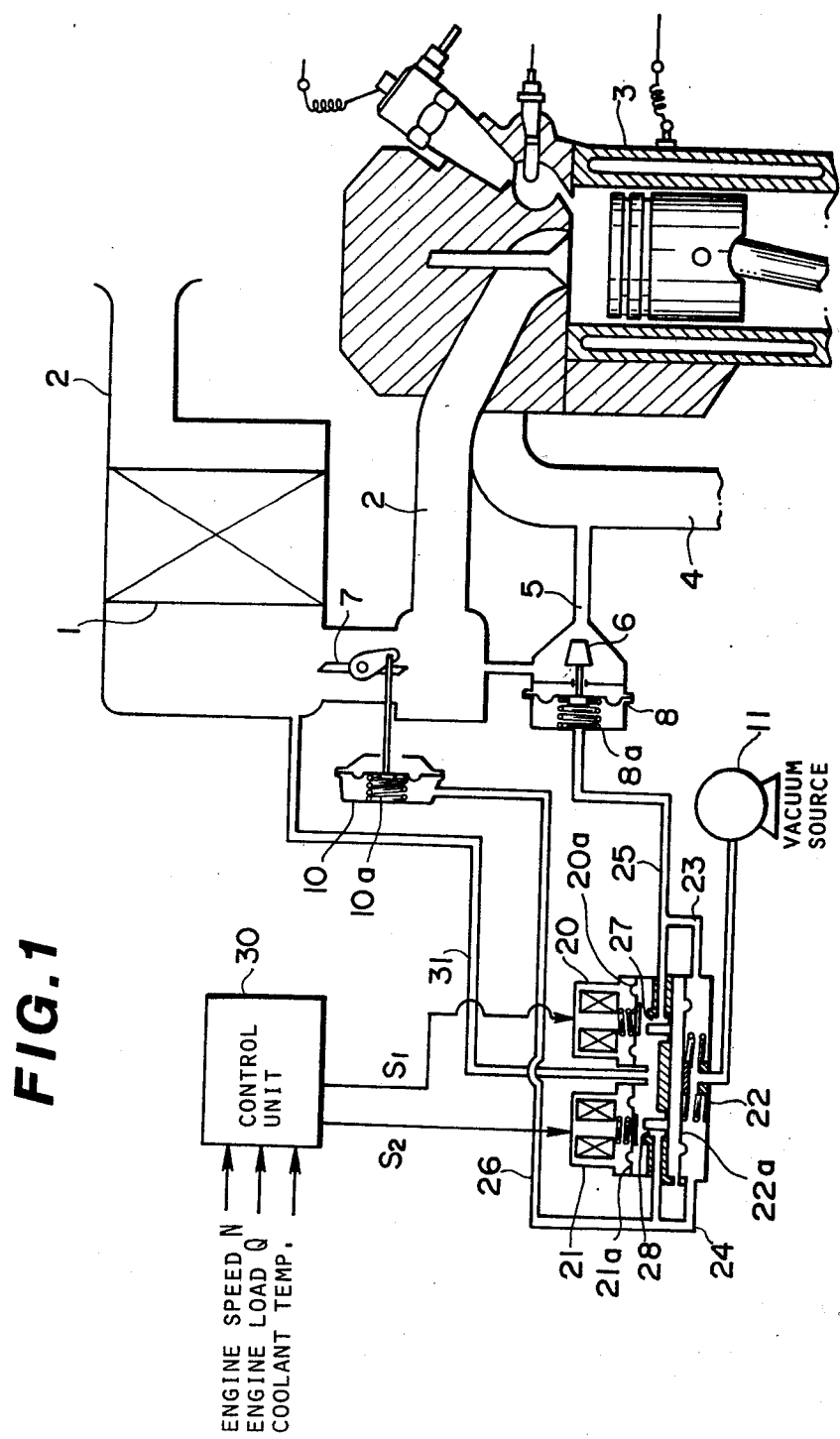
FIG. 1 is a diagramatic view of a preferred embodiment of the EGR control apparatus according to the present invention, associated with an internal combustion engine.

The same reference numerals are used throughout the drawings to designate the same or similar parts.

FIG. 1 is a diagrammatic view of a preferred embodiment of an EGR control apparatus according to the present invention, associated with a diesel engine wherein an intake air passageway 2, provided with an air cleaner 1, leads to a diesel engine 3. An EGR valve 6 is provided in an EGR passageway 5 connecting an exhaust gas passageway 4 and the intake air passageway 2. An air intake valve 7 is provided in the intake passageway 2 upstream of the junction of the EGR passageway 5 and passageway 2, thereby controlling the recirculation of exhaust gas. The apparatus is also provided with a pair of control electromagnetic valves 20 and 21 which control EGR control valve 6 and air intake throttle valve 7 independently. The apparatus is also provided with a constant-pressure valve 22 which adjusts the vacuum pressure from a vacuum pump 11 to a constant valve. A pair of vacuum conducting passageways 23 and 24 from the constant-pressure valve 22 are connected to a pair of corresponding vacuum passageways 25 and 26 which connect diaphragm actuator devices 8 and 10 for EGR valve 6 and intake valve 7, respectively to electromagnetic valves 20 and 21. When valves 20 and 21 are on, passageways 25 and 26 take in the atmospheric air from their respective inlet openings 27 and 28, thereby mixing the constant-vacuum pressure with the atmospheric pressure. Reference numeral 31 denotes a passageway for conducting the atmospheric air from intake passageway 2 upstream of intake throttle valve 7 to valves 20 and 21.

Passageway 31 opens into a chamber, the upper boundary of which is defined by spring-biased diaphragms 20a and 21a which are actuated by control valves 20 and 21. As control valves 20 and 21 open and close, they accordingly open and seal the respective inlet openings 27 and 28 via diaphragms 20a and 21a. Constant valve 22 is provided with a diaphragm 22a whose outer surface is exposed to the atmosphere.

Electromagnetic control valves 20 and 21 usually open and close at a frequency of about 30 to 50 Hz; their duty cycles are controlled by pulse signals from control unit 30 which may contain a microprocessor. The control unit 30 receives signals indicative of engine speed, load, and the temperature of engine coolant to calculate signals S1 and S2 used to control electromagnetic valves 20 and 21.

Figure 2:
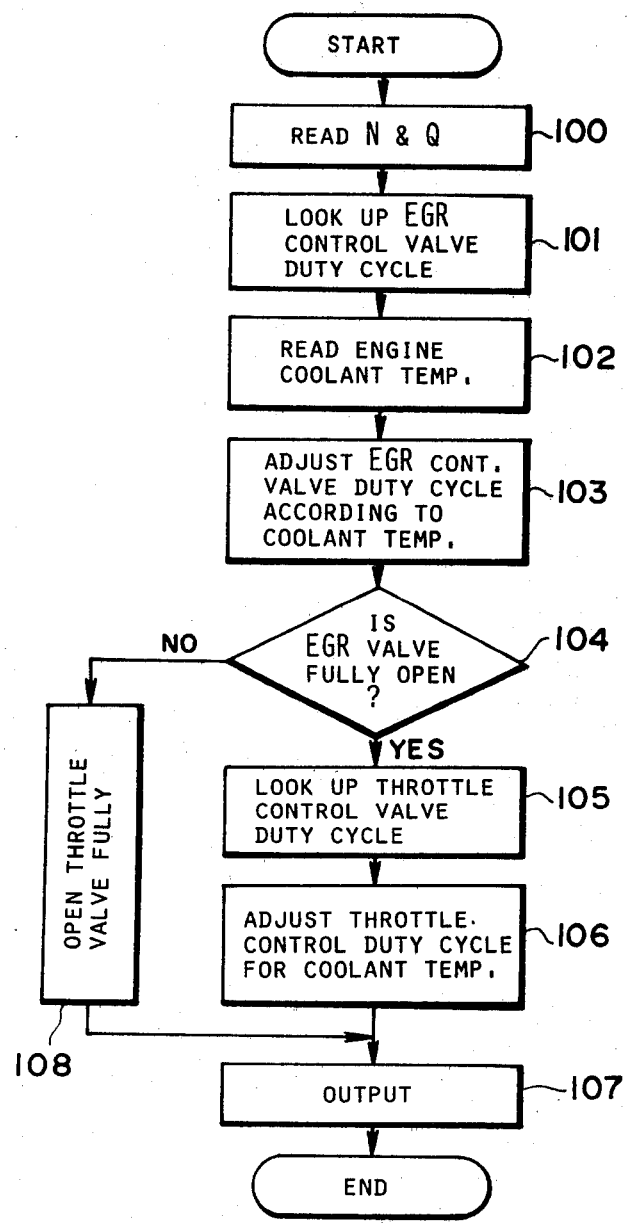
FIG. 2 is a flowchart for operating the apparatus according to the present invention.

The operation of control unit 30 will be described with reference to the flowchart shown in FIG. 2. At first, signals indicative of engine speed N and engine load Q are received and digitalized at step 100. Then, at step 101, the desired opening of the EGR valve previously stored in a memory, not shown, is found with reference to the values of N and Q by the table look-up method, for example, from FIG. 3. At step 102, the temperature of engine coolant is measured. The data obtained at step 101 is adjusted in accordance with the current temperature of engine coolant at step 103. The resultant value determines the duty cycle of the signal S1 which drives electromagnetic valve 20. When the duty cycle of electromagnetic valve 20 increases, the rate of opening of the inlet 27 by valve 20 increases so that the proportion of atmospheric pressure in the controlled pressure of passageway 25 increases. The vacuum conducted from the vacuum passageway 25 to diaphragm device chamber 8a thus decreases, thereby decreasing the opening cross-section of valve 6.

Figure 4:
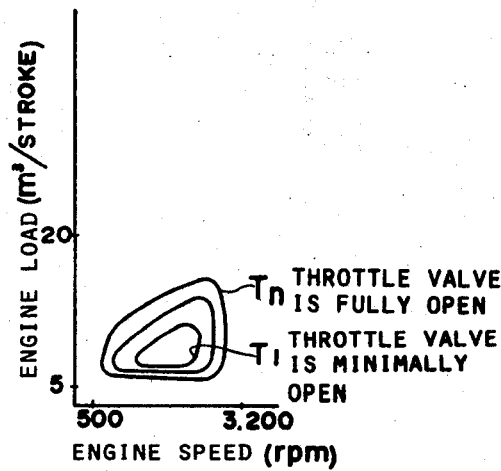
FIG. 4 is a graph of the relationship of engine speed and load with respect to the opening of throttle valve.

At step 104, if EGR valve 6 is fully open, control unit 30 determines the desired value of the opening of valve 7 in accordance with the measured values of N and Q at the same time by table look-up at step 105 for example, from the graph of FIG. 4. At step 106, the data obtained is adjusted in accordance with a signal indicative of the temperature of engine coolant, thereby determining the duty cycle of signal S2 which drives electromagnetic valve 21. If EGR valve is not fully open, throttle valve 7 is fully opened at step 108.

Figure 3:
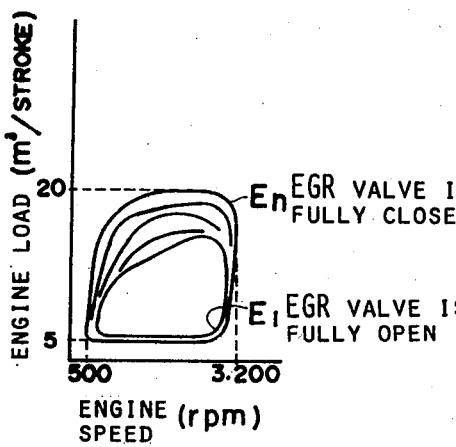
FIG. 3 is a graph of the relationship of engine speed and load with respect to the opening of EGR valve.

FIG. 3 shows the characteristic curves of equal opening of EGR valve 6 with respect to engine speed and load. The innermost curve E1 denotes the full opening or 100% duty cycle of valve 6 and the outermost curve En shows the complete closing of valve 6.

In a similar way, FIG. 4 shows the characteristic curves of equal opening of valve 7. The innermost curve T1 is used for holding the opening of intake valve 7 to a minimum value in view of engine efficiency. However, intake throttle valve 7 is provided with a suitable stop, not shown, so as to ensure a minimum opening of valve 7 so that valve 7 is not fully closed even when the duty cycle is 0% and control vacuum is maximum. The outermost curve Tn shows the full opening of intake throttle valve 7.

When the duty cycle of electromagnetic valve 21 is controlled by drive signal S2, the vacuum pressure conducted into diaphragm chamber 10a is adjusted, and thereby the opening of valve 7 is adjusted. As the opening of valve 7 decreases, the intake vacuum downstream of valve 7 increases so that the flow of exhaust gas from EGR passageway 5 to intake passageway 2 increases. The adjustment in accordance with the temperature of engine coolant is effected to decrease the rate of EGR to ensure stable combustion when engine has not warmed up sufficiently to prevent incomplete combustion.

When EGR rate is relatively small, only the opening of EGR valve 6 is controlled i.e., intake throttle valve 7 is maintained fully open by maintaining the duty cycle of electromagnetic valve 21 at 100% through control unit 30. In this case, since throttle valve 7 is fully open, the resulting intake vacuum is small so that the recirculation of exhaust is limited. As the opening of EGR valve 6 gradually increases and reaches the fully-open state, the amount of EGR can no longer increase so that after the valve 6 reaches its maximum opening, the opening of intake throttle valve 7 should be gradually decreased via valve 21. This increases the intake vacuum pressure so that although the opening of EGR valve 6 is constant, the difference in pressure between EGR passageway 4 and intake passageway 2 increases, thereby increasing the EGR rate. Thus, the EGR rate is maximized when the EGR valve 6 is fully open and intake throttle valve 7 is minimally open.

This relationship between the throttle and EGR valves has an advantageous effect on hydrocarbon emissions and overall engine performance. Specifically, full-throttle variation of the EGR rate ensures the least possible HC emissions with a moderate effect on NOx emissions, as explained in detail below.

Figure 5:
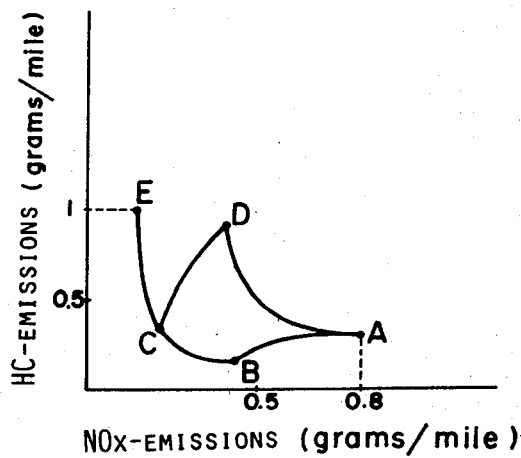
FIG. 5 is a graph of the relationship of HC emissions and NOx emissions in accordance with engine speed and load.

FIG. 5 shows the relationship between NOx and HC emissions at a vehicle speed of 40 miles per hour when engine speed and load are constant and the opening of valves 6 and 7 are respectively varied. The curve between points A and B represents conditions when throttle valve 7 is fully open and the duty cycle of EGR control valve 6 is controlled. The opening of EGR valve 6 increases from A to B. The curve B-C-E shows the case in which the EGR valve is fully open and throttle valve 7 is adjusted in which case the opening of intake throttle valve 7 decreases from B to E. The curve C-D shows the case in which intake throttle valve 7 is maintained at a predetermined opening and EGR valve 6 is adjusted. The curve D-A shows the case in which the EGR valve 6 is fully closed, and so effects no EGR, and intake throttle valve 7 is adjusted.

When no EGR is effected and the opening of intake throttle valve 7 is small, as at point D, NOx emissions are suitable controlled, but HC emissions are relatively great. As the opening of valve 7 increases, the amount of NOx emissions increases whereas the amount of HC emissions decreases. However, as is clear from the above, the present invention need not operate in this combinedemission range. Specifically, the throttle valve opening and EGR rate are adjusted along the curve A-B-C, so that the amount of NOx emissions can freely be decreased without appreciably increasing the amount of HC emissions. The prior art control apparatus can not effect control along the curve A-B, and therefore in order to suitably limit exhaust missions excessive EGR may be effected depending on engine operating conditions, thereby deteriorating fuel economy and driving response. However, the present invention eliminates these problems.

Figure 6:
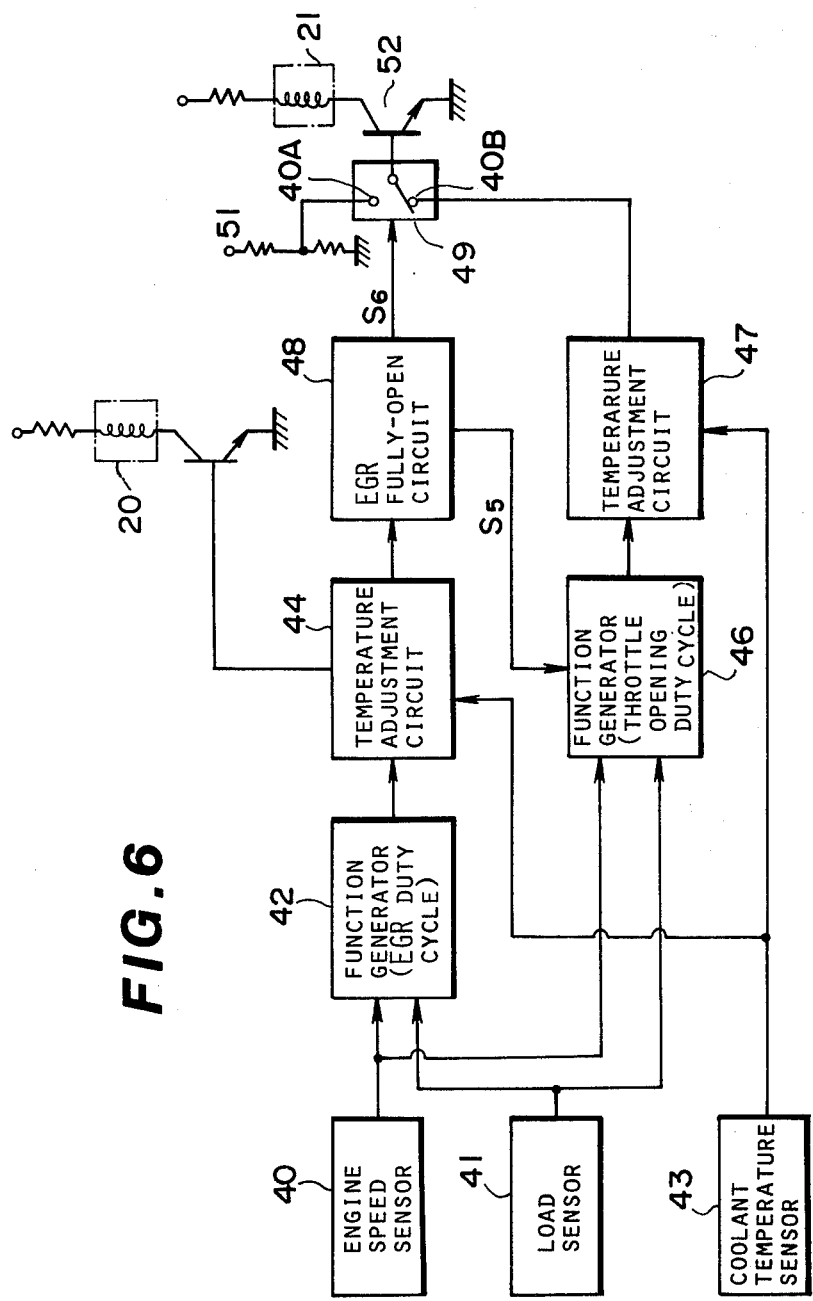
FIG. 6 is a block diagram of the control apparatus according to the present invention.

FIG. 6 is a block diagram of control unit 30 associated with sensors 40, 41, 43 and electromagnetic valves 20 and 21. The appropriate duty cycle for a drive pulse signal for electromagnetic valve 20 which controls the opening of EGR control valve 6 is selected by a first function generator 42 in accordance with signals from engine speed sensor 40 and load sensor 41. The duty cycle of the pulse signal is then adjusted on the basis of the output of engine coolant sensor 43 by coolant temperature adjustment unit 44 so as to slightly decrease the EGR rate when engine is relatively cold. The adjusted duty cycle signal is then outputted to an actuator of valve 20 for control thereof, and to an EGR-fully-open circuit 48 which outputs signals S5 and S6 when EGR valve 6 is fully open, i.e., when the duty cycle of valve 20 is 0%.

A second function generator 46 which determines the opening of intake throttle valve 7 also selects the control duty cycle of control electromagnetic valve 21 so as to attain the optimal operational state of engine as indicated on the basis of the outputs of the engine speed sensor 40 and load sensor 41. The second function generator 46 is gated by signal S5 such that when signal S5 is absent, the throttle duty cycle signal is 0%, and in the presence of signal S5, the throttle duty cycle value is determined on the basis of FIG. 4. In the latter case, the throttle duty cycle signal is adjusted according to sensed engine coolant temperature by an adjustment circuit 47. The output of this function generator 46 is adjusted by an engine coolant temperature adjustment unit 47 in the opposite sense as in the output of the first function generator 42. The throttle duty cycle signal is conducted to one terminal 40B of a switching circuit 49, the other terminal 40A of which is connected to a reference voltage supply 51. Signal S6 serves to connect the first terminal 40B to the output contact of the switching circuit 49 when the EGR valve 6 is fully open; otherwise, the reference voltage is outputted through the switching circuit 49. The output of the switching circuit 49 is used to control an actuator 52 of the electromagnetic valve 21, which in turn controls throttle valve 7 positioning. Thus, when the EGR valve 7 is not fully open, the reference voltage continuously activates valve 21 to hold the throttle valve 7 wide open, while the throttle duty cycle signal is used to control valve 21 when the EGR valve 6 is open.

While the present invention has been described and shown in terms of a preferred embodiment thereof, it should be noted that the present invention should not be limited to the particular embodiment. Various changes and modifications could be possible by those skilled in the art without departing from the spirit and scope of the present invention as set forth in the attached claims.

What is claimed is:

1. A method for controlling exhaust emissions from an internal combustion engine equipped with a throttled air intake passage and an exhaust passage linked to the intake passage via an exhaust gas recirculation (EGR) valve, comprising the steps of:
   (a) measuring engine operating conditions;
   (b) determining a desired degree of EGR valve opening on the basis of the measured engine operating conditions;
   (c) opening the EGR valve to the desired degree;
   (d) determining a desired degree of throttle valve opening on the basis of engine operating conditions;
   (e) detecting whether the EGR valve is completely open;
   (f) opening the throttle valve to the desired degree in response to detection of a completely open EGR valve; and
   (g) completely opening the throttle valve in response to detection of a partially open EGR valve.

2. The method of claim 1, wherein said engine operating conditions measured are engine speed, engine load, and engine coolant temperature.

3. The method of claim 2, wherein the steps of determining the desired degree of EGR and throttle valve opening respectively comprise the steps of:
   (a) determining a first value indicative of valve opening on the basis of measured engine speed and engine load; and
   (b) adjusting the first value according to measured engine coolant temperature.

4. The method of claim 3, wherein said first value is determined by retrieving a stored value from a memory addressed in accordance with measured engine speed and load, the memory storing predetermined first values in accordance with engine speed and load.

5. An exhaust gas recirculation (EGR) control apparatus equipped with an air intake passage, throttle valve means disposed in said air intake passage for controlling a flow of air through said intake passage in accordance with the degree of opening of said throttle valve means, an exhaust gas passage, an exhaust gas recirculation passage connecting the air intake passage to the exhaust gas passage, and EGR valve means disposed in said exhaust gas passage for controlling the flow of exhaust gas from said exhaust passage to said intake passage in accordance with the degree of opening of said EGR valve means, said apparatus comprising:
   (a) means for measuring engine operating conditions;
   (b) means for determining a desired degree of opening of said EGR valve means on the basis of measured engine operating conditions;
   (c) means for opening said EGR valve means to the desired degree;
   (d) means for determining a desired degree of opening of said throttle valve means on the basis of engine operating conditions;
   (e) means for detecting whether said EGR valve means is completely open;
   (f) means for opening said throttle valve means to the desired degree in response to detection of a completely open EGR valve means; and
   (g) means for completely opening said throttle valve means in response to detection of a partially open EGR valve means.

6. The apparatus of claim 5, wherein said EGR and throttle valve opening means respectively comprise a vacuum actuator directly connected to the corresponding valve for controlling the degree of opening thereof in accordance with a control vacuum pressure supplied thereto, and an electromagnetic valve responsive to a corresponding control signal indicative of the determined degree of opening of the corresponding one of said EGR and throttle valves for adjusting a control vacuum pressure supplied to the corresponding vacuum actuator; and further including a common housing in which the electromagnetic valves are located and connected to adjust the respective control pressures by controlling a proportion of admixture of atmospheric air to a vacuum pressure from a common reference vacuum pressure source.

7. The apparatus of claim 6, wherein said control signals are in the form of variable duty cycle signals.

8. The apparatus of claim 6 or 7, wherein said throttle valve opening means responds to the EGR valve opening control signal to replace the throttle valve opening control signal with a reference voltage indicative of a fully-open throttle when the EGR valve opening control signal indicates a partially-open EGR valve.

* * * * *